United States Patent
Shimada et al.

(10) Patent No.: US 9,926,662 B2
(45) Date of Patent: Mar. 27, 2018

(54) WATER/OIL REPELLANT COMPOSITION, ARTICLE AND PROCESS FOR PRODUCING ARTICLE

(71) Applicant: ASAHI GLASS COMPANY, LIMITED, Chiyoda-ku (JP)

(72) Inventors: Minako Shimada, Chiyoda-ku (JP); Sho Masuda, Chiyoda-ku (JP); Kazunori Sugiyama, Chiyoda-ku (JP); Kyoichi Kaneko, Chiyoda-ku (JP); Yuichi Oomori, Chiyoda-ku (JP); Motonobu Sakakibara, Kyoto (JP); Masahiro Miyazaki, Kyoto (JP); Kazuhiro Kawakami, Kyoto (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 8 days.

(21) Appl. No.: 15/097,837

(22) Filed: Apr. 13, 2016

(65) Prior Publication Data
US 2016/0222580 A1  Aug. 4, 2016

Related U.S. Application Data

(63) Continuation of application No. PCT/JP2014/080969, filed on Nov. 21, 2014.

(30) Foreign Application Priority Data

Nov. 26, 2013  (JP) ................................ 2013-244291

(51) Int. Cl.
| | | |
|---|---|---|
| *D06M 15/277* | (2006.01) | |
| *D06M 15/248* | (2006.01) | |
| *D06M 15/263* | (2006.01) | |
| *D06M 15/29* | (2006.01) | |
| *C08F 220/24* | (2006.01) | |
| *D06M 15/256* | (2006.01) | |
| *D06M 15/564* | (2006.01) | |
| *D06M 23/16* | (2006.01) | |
| *D06M 101/34* | (2006.01) | |

(52) U.S. Cl.
CPC ......... *D06M 15/277* (2013.01); *C08F 220/24* (2013.01); *D06M 15/248* (2013.01); *D06M 15/256* (2013.01); *D06M 15/263* (2013.01); *D06M 15/29* (2013.01); *D06M 15/564* (2013.01); *D06M 23/16* (2013.01); *D06M 2101/34* (2013.01); *D06M 2200/11* (2013.01); *D06M 2200/12* (2013.01)

(58) Field of Classification Search
CPC ............ D06M 15/277; D06M 15/248; D06M 15/263; D06M 15/29
USPC ....................................................... 524/520
See application file for complete search history.

(56) References Cited

U.S. PATENT DOCUMENTS

| | | | |
|---|---|---|---|
| 6,013,732 A | 1/2000 | Yamana et al. | |
| 8,703,864 B2 * | 4/2014 | Shimada | C08F 214/18 524/755 |
| 2009/0085001 A1 | 4/2009 | Furuta et al. | |
| 2010/0179287 A1 | 7/2010 | Sugiyama et al. | |
| 2014/0051805 A1 | 2/2014 | Shimada et al. | |

FOREIGN PATENT DOCUMENTS

| | | |
|---|---|---|
| JP | 7-229070 | 8/1995 |
| JP | 10-204777 | 8/1998 |
| JP | 10-251693 | 9/1998 |
| JP | 2003-13364 | 1/2003 |
| WO | WO 2007/114302 A2 | 10/2007 |
| WO | WO 2009/041648 A1 | 4/2009 |
| WO | WO 2010/047258 A1 | 4/2010 |
| WO | WO 2010/123042 A1 | 10/2010 |
| WO | WO 2012/147700 A1 | 11/2012 |

OTHER PUBLICATIONS

International Search Report dated Feb. 17, 2015 in PCT/JP2014/080969 filed on Nov. 21, 2014.

* cited by examiner

*Primary Examiner* — Deve E Valdez
(74) *Attorney, Agent, or Firm* — Oblon, McClelland, Maier & Neustadt, L.L.P.

(57) ABSTRACT

A water/oil repellent composition which comprises a copolymer (A) comprising from 40 to 95 mass % of monomer (a1) units, from 1 to 60 mass % of monomer (a2) units and from 0 to less than 5 mass % of monomer (a3) units, a copolymer (B) comprising from 40 to 91 mass % of monomer (b1) units, from 2 to 20 mass % of monomer (b2) units, from 5 to 20 mass % of monomer (b3) units, and from 2 to 20 mass % of vinyl chloride (b4) units, and a liquid medium (C), wherein monomers (a1) and (b1) are $(Z-Y)_nX$ [Z is a $C_{1-6}$ polyfluoroalkyl group, etc., Y is a divalent organic group having no fluorine atom, etc., n is 1 or 2, and X is a specific group having a polymerizable unsaturated group], monomers (a2) and (b2) are vinylidene chloride or vinylidene fluoride, and monomers (a3) and (b3) are a (meth)acrylate having a saturated hydrocarbon group having at least 12 carbon atoms.

14 Claims, No Drawings

WATER/OIL REPELLANT COMPOSITION, ARTICLE AND PROCESS FOR PRODUCING ARTICLE

TECHNICAL FIELD

The present invention relates to a water/oil repellent composition, an article having a porous substrate treated with the water/oil repellent composition, and a process for producing the article.

BACKGROUND ART

As a method for imparting water/oil repellency to the surface of a porous substrate such as fabric, a method of treating the substrate with a water/oil repellent composition composed of an emulsion having, dispersed in an aqueous medium, a copolymer having units based on a monomer having a polyfluoroalkyl group (hereinafter a polyfluoroalkyl group will be referred to as a $R^f$ group) having at least 8 carbon atoms has been known.

However, recently, EPA (US Environmental Protection Agency) has pointed out that a compound having a perfluoroalkyl group (hereinafter a perfluoroalkyl group will be referred to as a $R^F$ group) having at least 7 carbon atoms is likely to be decomposed in the environment or in the body, and the decomposition product is likely to be accumulated, i.e. it presents a high environmental impact. Therefore, a water/oil repellent composition comprising a copolymer which has units based on a monomer having a $R^F$ group having at most 6 carbon atoms, and has no units based on a monomer having a $R^F$ group having at least 7 carbon atoms, has been required.

As a water/oil repellent composition comprising such a copolymer, for example, the following water/oil repellent compositions (1) and (2) have been proposed.

(1) A water/oil repellent composition comprising a copolymer having units based on the following monomer (a), units based on the following monomer (b) and units based on the following monomer (c), and a liquid medium, wherein the molar ratio ((a)/(b)) of the units based on the monomer (a) to the units based on the monomer (b) is at least 1 (Patent Document 1).

Monomer (a): vinyl chloride.
Monomer (b): a vinyl ether having no $R^f$ group and having a crosslinkable functional group.
Monomer (c): a monomer having a $R^F$ group having at most 6 carbon atoms.

(2) A water/oil repellent composition comprising a copolymer having units based on the following monomer (a) and units based on the following monomer (b), and as the case requires, units based on the following monomer (c), and having a mass average molecular weight of at least 40,000, and a liquid medium (Patent Document 2).

Monomer (a): a monomer having a $R^F$ group having at most 6 carbon atoms.
Monomer (b): vinylidene chloride.
Monomer (c): a monomer having no $R^f$ group and having a crosslinkable functional group.

By the way, in an article having its surface treated with a water/oil repellent composition (a textile product such as a sports wear), a moisture-permeable waterproofing film may be formed on the back side so as to impart a function to release water vapor by sweating from the body and a function to prevent penetration of rain (Patent Document 3).

As a method for producing fabric having such a moisture-permeable waterproofing film, a coating method is, for example, well known.

The coating method is a method of applying a coating liquid containing a polyurethane resin, an acrylic resin or the like to the back side of fabric treated with a water/oil repellent composition. For the fabric, it is required that the bonded or applied resin film is not easily peeled off.

As a liquid medium contained in the coating liquid, in the case of dry coating of forming a resin film by drying after application, a highly volatile solvent such as methyl ethyl ketone, ethyl acetate, toluene or isopropyl alcohol is used. Whereas, in the case of wet coating of forming a resin film by solidification in water, a polar organic solvent such as N,N-dimethylformamide (hereinafter referred to as DMF) is used.

PRIOR ART DOCUMENTS

Patent Documents

Patent Document 1: WO2010/047258
Patent Document 2: WO2010/123042
Patent Document 3: JP-A-07-229070

DISCLOSURE OF INVENTION

Technical Problem

However, if a coating liquid is applied to the back side of fabric treated with the water/oil repellent composition (1) as disclosed in Patent Document 1 to form a moisture-permeable waterproofing film, the coating liquid penetrates to the face side of the fabric, and a resin film is formed even on the face side of the fabric, thus impairing the design of the article.

On the other hand, if a coating liquid is applied to the back side of fabric having its surface treated with the water/oil repellent composition (2) as disclosed in Patent Document 2 to form a moisture-permeable waterproofing film, penetration of the coating liquid to the face side of the fabric is inhibited. However, the adhesion between the fabric having its surface treated with the water/oil repellent composition (2) and the moisture-permeable waterproofing film is insufficient, and there is a problem such that the moisture-permeable waterproofing film is likely to be peeled off.

The object of the present invention is to provide a water/oil repellent composition whereby it is possible to obtain an article which is excellent in water/oil repellency, through which penetration of a coating liquid for formation of a moisture-permeable waterproofing film can be suppressed, and from which peeling of the moisture-permeable waterproofing film is suppressed, and which presents a low environmental impact; an article having a porous substrate treated with the water/oil repellent composition; and a process for producing the article.

Solution to Problem

The present invention provides the following [1] to [14].
[1] A water/oil repellent composition which comprises a copolymer (A) comprising from 40 to 95 mass % of units based on the following monomer (a1), from 1 to 60 mass % of units based on the following monomer (a2), and from 0 to less than 5 mass % of units based on the following monomer (a3), a copolymer (B) comprising from 40 to 91 mass % of units based on the following monomer (b1), from 2 to 20 mass % of units based on the following monomer (b2), from 5 to 20 mass % of units based on the following monomer (b3), and from 2 to 20 mass % of units based on the following monomer (b4), and a liquid medium (C), monomer (a1): a compound represented by the following formula (1):

$$(Z-Y)_n X \quad (1)$$

wherein Z is a $C_{1-6}$ polyfluoroalkyl group or any one of the following formulae (2-1) to (2-3), Y is a divalent organic group having no fluorine atom, or a single bond, n is 1 or 2, and X is, when n is 1, a group represented by any one of the following formulae (3-1) to (3-5) and, when n is 2, a group represented by any one of following formulae (4-1) to (4-4), $$C_i F_{2i+1} O(CFX^1 CF_2 O)_j CFX^2 \quad (2\text{-}1)$$

$$C_i F_{2i+1}[CH_2 CF_2]_v - \quad (2\text{-}2)$$

$$C_i F_{2i+1}[CH_2 CF_2]_v [CF_2 CF_2]_r - \quad (2\text{-}3)$$

wherein i is an integer of from 1 to 6, j is an integer of from 0 to 10, v is an integer of from 1 to 4, r is an integer of from 1 to 3, and each of $X^1$ and $X^2$ which are independent of each other, is a fluorine atom or a trifluoromethyl group, $$-CR^2=CH_2 \quad (3\text{-}1),$$

$$-C(O)OCR^2=CH_2 \quad (3\text{-}2),$$

$$-OC(O)CR^2=CH_2 \quad (3\text{-}3),$$

$$-OCH_2-\varphi-CR^2=CH_2 \quad (3\text{-}4),$$

$$-OCH=CH_2 \quad (3\text{-}5),$$

wherein $R^2$ is a hydrogen atom, a methyl group or a halogen atom, and $\varphi$ is a phenylene group, $$-CH[-(CH_2)_m CR^3=CH_2]- \quad (4\text{-}1),$$

$$-CH[-(CH_2)_m C(O)OCR^3=CH_2]- \quad (4\text{-}2),$$

$$-CH[(CH_2)_m OC(O)CR^3=CH_2]- \quad (4\text{-}3),$$

$$-OC(O)CH=CHC(O)O- \quad (4\text{-}4),$$

wherein $R^3$ is a hydrogen atom, a methyl group or a halogen atom, and m is an integer of from 0 to 4, monomer (a2): vinylidene chloride or vinylidene fluoride, monomer (a3): an acrylate or methacrylate having a saturated hydrocarbon group having at least 12 carbon atoms, monomer (b1): a compound represented by the above formula (1), monomer (b2): vinylidene chloride or vinylidene fluoride, monomer (b3): an acrylate or methacrylate having a saturated hydrocarbon group having at least 12 carbon atoms, monomer (b4): vinyl chloride.

[2] The water/oil repellent composition according to [1], wherein in the compound represented by the formula (1), Z is a $C_{4-6}$ perfluoroalkyl group, Y is a $C_{1-4}$ alkylene group, n is 1, and, X is $-C(O)OCR^2=CH_2$ (wherein $R^2$ is a hydrogen atom, a methyl group, a fluorine atom or a chlorine atom).

[3] The water/oil repellent composition according to [1] or [2], wherein in the total (100 mass %) of the copolymer (A) and the copolymer (B), the proportion of the copolymer (A) is from 20 to 90 mass %, and the proportion of the copolymer (B) is from 10 to 80 mass %.

[4] The water/oil repellent composition according to any one of [1] to [3], wherein the copolymer (A) further has units based on the following monomer (a4), monomer (a4): vinyl chloride.

[5] The water/oil repellent composition according to any one of [1] to [4], wherein the copolymer (A) further has units based on the following monomer (a5), monomer (a5): a monomer having no polyfluoroalkyl group and having a crosslinkable functional group.

[6] The water/oil repellent composition according to any one of [1] to [5], wherein the copolymer (B) further has units based on the following monomer (b5), monomer (b5): a monomer having no polyfluoroalkyl group and having a crosslinkable functional group.

[7] The water/oil repellent composition according to any one of [1] to [6], wherein the mass average molecular weight (Mw) of the copolymer (A) is larger than the mass average molecular weight (Mw) of the copolymer (B), and the difference is from 5,000 to 400,000, or the number average molecular weight (Mn) of the copolymer (A) is larger than the number average molecular weight (Mn) of the copolymer (B), and the difference is from 2,000 to 50,000.

[8] The water/oil repellent composition according to any one of [1] to [7], wherein the difference between the content (mass %) of units based on the monomer (a3) in the copolymer (A) and the content (mass %) of units based on the monomer (b3) in the copolymer (B) is at least 2 (mass %).

[9] The water/oil repellent composition according to any one of [1] to [8], wherein $R^2$ in either the units based on the monomer (a1) in the copolymer (A) or the units based on the monomer (b1) in the copolymer (A) is a hydrogen atom or a methyl group, and $R^2$ in the other is a fluorine atom or a chlorine atom.

[10] An article having a porous substrate, wherein the porous substrate has a water/oil repellent-treated surface treated with the water/oil repellent composition as defined in any one of [1] to [9] on at least one side, and has a moisture-permeable waterproofing film on one side.

[11] The article according to [10], wherein the treated porous substrate has water/oil repellent-treated surfaces on both sides, and has the moisture-permeable waterproofing film on one water/oil-repellent treated surface.

[12] The article according to [10] or [11], wherein the porous substrate is fabric.

[13] A process for producing an article having a porous substrate, which comprises treating at least one side of a porous substrate with the water/oil repellent composition as defined in any one of [1] to [9] to form a water/oil repellent-treated surface, and then applying a coating liquid containing a material of the moisture-permeable waterproofing film to one side of the porous substrate to form a moisture-permeable waterproofing film.

[14] The process for producing an article according to [13], wherein the water/oil repellent-treated surface is formed on both side of the substrate, and then the moisture-permeable waterproofing film is formed on one water/oil repellent-treated surface.

Advantageous Effects of Invention

By treating a porous substrate such as fabric with the water/oil repellent composition of the present invention, it is possible to obtain a porous substrate which is excellent in water/oil repellency, through which penetration of a coating liquid for formation of a moisture-permeable waterproofing film is suppressed, and from which peeling of the moisture-permeable waterproofing film is suppressed. Further, the water/oil repellent composition of the present invention presents a low environmental impact.

The article having a porous substrate treated with the water/oil repellent composition of the present invention has good water/oil repellency and is excellent in the design since penetration of a coating liquid for formation of a moisture-permeable waterproofing film is suppressed, and further, the moisture-permeable waterproofing film is hardly peeled off, and the article presents a low environmental impact.

According to the process of the present invention, it is possible to obtain an article having a porous substrate which has a water/oil repellent-treated surface and a moisture-permeable waterproofing film, which has good water/oil repellency, through which penetration of a coating liquid for forming a moisture-permeable waterproofing film is suppressed and from which peeling of the moisture-permeable waterproofing film is suppressed.

DESCRIPTION OF EMBODIMENTS

In this specification, a compound represented by the formula (1) will be referred to as a "compound (1)". Compounds represented by other formulae will also be referred to in the same manner.

In this specification, a group represented by the formula (2-1) will be referred to as a "group (2-1)". Groups represented by other formulae will also be referred to in the same manner.

A "(meth)acrylate" in this specification is a generic term for an acrylate and a methacrylate and individually means an acrylate or a methacrylate.

In this specification, a monomer means a compound having a polymerizable unsaturated group.

In this specification, a $R^f$ group is a group having some or all of hydrogen atoms in an alkyl group substituted by fluorine atoms, and a $R^F$ group is a group having all the hydrogen atoms in an alkyl group substituted by fluorine atoms.

In this specification, among substrates to be water/oil repellent-treated with the water/oil repellent composition, a substrate which is porous will be referred to as a "porous substrate". A representative example of the porous substrate is a sheet-form porous substrate such as fabric.

In this specification, a moiety derived from a monomer constituting a polymer will be referred to as "units based on a monomer" or "monomer units". Units based on a monomer may sometimes be represented by the name of the monomer followed by "units".

The proportion of monomer units in a copolymer in the present invention is obtained from NMR analysis and elemental analysis. In a case where it cannot be determined from the NMR analysis and the elemental analysis, it may be calculated based on the amount of monomers charged at the time of preparation of the copolymer.

The mass average molecular weight (Mw) and the number average molecular weight (Mn) of a copolymer are molecular weights as calculated as polystyrene, measured by gel permeation chromatography (GPC), and specifically, measured by the following method.

A copolymer is dissolved in a solvent mixture of a fluorinated solvent (AK-225 manufactured by Asahi Glass Company, Limited)/tetrahydrofuran (THF)=6/4 (volume ratio) to prepare a 0.5 mass % solution, which is passed through a 0.2 μm filter to prepare a sample for analysis. With respect to the sample, the number average molecular weight (Mn) and the mass average molecular weight (Mw) are measured under the following conditions.

Measurement temperature: 37° C.,
injected amount: 50 μL,
outflow rate: 1 mL/min,
eluent: a solvent mixture of a fluorinated solvent (AK-225 manufactured by Asahi Glass Company, Limited)/THF=6/4 (volume ratio).

<Water/Oil Repellent Composition>

The water/oil repellent composition of the present invention comprises a specific copolymer (A), a specific copolymer (B) and a liquid medium (C) as essential components, and as the case requires, contains a surfactant (D) and additives (E). As the copolymer (A), one type may be used alone, or two or more types may be used in combination. As the copolymer (B), one type may be used alone, or two or more types may be used in combination.

(Copolymer (A))

The copolymer (A) has units based on monomer (a1) and units based on monomer (a2).

The copolymer (A) may not have units based on monomer (a3) or may have such units in an amount of less than a predetermined amount.

The copolymer (A) preferably further has units based on monomer (a4).

The copolymer (A) may have, as the case requires, units based on monomer (a5).

The mass average molecular weight (Mw) of the copolymer (A) is preferably at least 10,000, more preferably at least 20,000, particularly preferably at least 100,000. In the case of at least the above lower limit value, the copolymer (A) will be excellent in water/oil repellency. The mass average molecular weight (Mw) of the copolymer (A) is preferably at most 1,000,000, more preferably at most 500,000, particularly preferably at most 250,000. In the case of at most the above upper limit value, the film-forming property will be excellent at the time when water/oil repellent treatment is applied on a porous substrate.

Or, the number average molecular weight (Mn) of the copolymer (A) is preferably at least 10,000, more preferably at least 20,000, particularly preferably at least 25,000. In the case of at least the above lower limit value, the copolymer (A) will be excellent in water/oil repellency. The number average molecular weight (Mn) is preferably at most 80,000, more preferably at most 60,000, particularly preferably at most 50,000. In the case of at most the above upper limit value, the film-forming property will be excellent at the time when water/oil repellent treatment is applied on a porous substrate.

The copolymer (A) preferably satisfies at least one of the above-mentioned mass average molecular weight (Mw) range and the above-mentioned number average molecular weight (Mn) range, and more preferably satisfies both of them.

(Copolymer (B))

The copolymer (B) has units based on monomer (b1), units based on monomer (b2), units based on monomer (b3) and units based on monomer (b4).

The copolymer (B) may have, as the case requires, units based on monomer (b5).

The mass average molecular weight (Mw) of the copolymer (B) is preferably at least 10,000, more preferably at least 15,000, particularly preferably at least 20,000. In the case of at least the above lower limit value, the copolymer (B) will be excellent in water/oil repellency. The mass average molecular weight (Mw) of the copolymer (B) is preferably at most 600,000, more preferably at most 300,000, particularly preferably at most 150,000. In the case of at most the above upper limit value, the film-forming property will be excellent at the time when water/oil repellent treatment is applied on a porous substrate.

Or, the number average molecular weight (Mn) of the copolymer (B) is preferably at least 8,000, more preferably at least 10,000, particularly preferably at least 12,000. In the case of at least the above lower limit value, the copolymer (B) will be excellent in water/oil repellency. The number average molecular weight (Mn) is preferably at most 60,000, more preferably at most 50,000, particularly preferably at most 40,000. In the case of at most the above upper limit value, the film-forming property will be excellent at the time when water/oil repellent treatment is applied on a porous substrate.

The copolymer (B) preferably satisfies at least one of the above-mentioned mass average molecular weight (Mw) range and the above-mentioned number average molecular weight (Mn) range, and more preferably satisfies both of them.

As between the mass average molecular weights (Mw) of the copolymer (A) and the copolymer (B) coexistent in the water/oil repellent composition, the mass average molecular weight of the copolymer (A) is preferably larger, and the difference is preferably from 5,000 to 400,000, more preferably from 5,000 to 200,000. In a case where two or more types of the copolymer (A) or the copolymer (B) are contained in the water/oil repellent composition, the difference in the average values of the mass average molecular weights is preferably from 5,000 to 400,000, more preferably from 5,000 to 200,000.

As between the number average molecular weights (Mn) of the copolymer (A) and the copolymer (B) coexistent in the water/oil repellent composition, the number average molecular weight of the copolymer (A) is preferably larger, and the difference is preferably from 2,000 to 50,000, more preferably from 2,000 to 40,000. In a case where two or more types of the copolymer (A) or the copolymer (B) are contained in the water/oil repellent composition, the difference in the average values of the number average molecular weights is preferably from 2,000 to 50,000, more preferably from 2,000 to 40,000.

Monomer (a1)) or (b1):

Monomer (a1) or (b1) is a compound (1). Monomer (a1)) units or monomer (b1) units contribute to development of water/oil repellency by the copolymer (A) or the copolymer (B).

Monomer (a1) units in the copolymer (A) may be of one type, or may be of two or more types. Monomer (b1) units in the copolymer (B) may be of one type, or may be of two or more types.

In the copolymer (A) and the copolymer (B) coexisting in the water/oil repellent composition, the monomer (a1)) units and the monomer (b1) units may be the same or different from each other. From the viewpoint of compatibility of the copolymer (A) and the copolymer (B), they are preferably the same.

$$(Z-Y)_n X \qquad (1)$$

Z is a $C_{1-6}$ $R^f$ group, or one of groups (2-1) to (2-3).

$$C_i F_{2i+1} O (CFX^1 CF_2 O)_j CFX^2— \qquad (2\text{-}1).$$

$$C_i F_{2i+1} [CH_2 CF_2]_v— \qquad (2\text{-}2).$$

$$C_i F_{2i+1} [CH_2 CF_2]_v [CF_2 CF_2]_r— \qquad (2\text{-}3).$$

wherein i is an integer of from 1 to 6, j is an integer of from 0 to 10, v is an integer of from 1 to 4, r is an integer of from 1 to 3, and each of $X^1$ and $X^2$ which are independent of each other, is a fluorine atom or a trifluoromethyl group.

As the $R^f$ group, a $R^F$ group is preferred. The $R^f$ group may be linear or branched, preferably linear. The $R^f$ group is particularly preferably a $C_{4-6}$ linear $R^F$ group.

Z may, for example, be the following groups.

$F(CF_2)_4—$, $F(CF_2)_5—$, $F(CF_2)_6—$, $(CF_3)_2 CF(CF_2—$, $C_k F_{2k+1} O[CF(CF_3)CF_2 O]_h—CF(CF_3)—$, $C_k F_{2k+1} [CH_2 CF_2]_w—$, $C_k F_{2k+1} [CH_2 CF_2]_w [CF_2 CF_2]_u—$, etc.

Here, k is an integer of from 1 to 6, h is from 0 to 10, w is from 1 to 4, and u is an integer of from 1 to 3.

Y is a divalent organic group having no fluorine atom, or a single bond.

As the divalent organic group, an alkylene group is preferred. The alkylene group may be linear or branched, and the number of carbon atoms is preferably from 1 to 6. The divalent organic group may be an organic group having —O—, —NH—, —CO—, —S—, —SO_2—, —CD^1=CD^2— (wherein each of $D^1$ and $D^2$ which are independent of each other, is a hydrogen atom or a methyl group.) or the like. A particularly preferred Y is a $C_{2-4}$ linear alkylene group.

Y may, for example, be the following groups.

—CH_2—, —CH_2CH_2—, —(CH_2)_3—, —CH_2CH_2CH(CH_3)—, —CH=CH—CH_2—, —S—CH_2CH_2—, —CH_2CH_2—S—CH_2CH_2—, —CH_2CH_2—SO_2—CH_2CH_2—, —W—, —W—OC(O)NH—V—NHC(O)O—(C_pH_{2p})—, etc.

Here, p is an integer of from 2 to 30.

V is an unbranched contrasting alkylene group, an arylene group or an aralkylene group, and is preferably —$C_6H_{12}$—, -φ-CH_2-φ- or -φ- (wherein φ is a phenylene group).

W is any one of the following groups.

—SO_2N(R^1)—C_dH_{2d}—CONHC_dH_{2d}—, —C_qH_{2q}—.

Here, $R^1$ is a hydrogen atom or a $C_{1-4}$ alkyl group, d is an integer of from 2 to 8, and q is an integer of from 1 to 20.

n is 1 or 2. It is preferred that n is 1.

X is, when n is 1, any one of groups (3-1) to (3-5), and when n is 2, any one of groups (4-1) to (4-4).

$$—CR^2=CH_2 \qquad (3\text{-}1),$$

$$—C(O)OCR^2=CH_2 \qquad (3\text{-}2),$$

$$—OC(O)CR^2=CH_2 \qquad (3\text{-}3),$$

$$—OCH_2\text{-}\varphi—CR^2=CH_2 \qquad (3\text{-}4),$$

$$—OCH=CH_2 \qquad (3\text{-}5),$$

wherein $R^2$ is a hydrogen atom, a methyl group or a halogen atom, and φ is a phenylene group. As the halogen atom, a chlorine atom or a fluorine atom is preferred.

When n is 1, X is preferably a group (3-3).

$$—CH[—(CH_2)_m CR^3=CH_2]— \qquad (4\text{-}1),$$

$$—CH[(CH_2)_m C(O)OCR^3=CH_2]— \qquad (4\text{-}2),$$

$$—CH[(CH_2)_m OC(O)CR^3=CH_2]— \qquad (4\text{-}3),$$

$$—OC(O)CH=CHC(O)O— \qquad (4\text{-}4),$$

wherein $R^3$ is a hydrogen atom, a methyl group or a halogen atom, and m is an integer of from 0 to 4.

When n is 2, X is preferably a group (4-3).

As the compound (1), preferred is an acrylate, methacrylate or 2-haloacrylate having a $C_{4-6}$ $R^f$ group, as it contributes to copolymerizability with other monomers, flexibility of a coating film containing the copolymer, adhesion of the copolymer to a substrate, dispersibility in a liquid medium (C), efficiency in emulsion polymerization, development of water repellency of the copolymer (A) and copolymer (B), etc.

As the compound (1), preferred is a compound wherein Z is a $C_{4-6}$ $R^F$ group, Y is a $C_{1-4}$ alkylene group, n is 1, and X is a group (3-3) (where $R^2$ is a hydrogen atom, a methyl group, a fluorine atom or a chlorine atom).

Preferred specific examples include $F(CF_2)_6CH_2CH_2OCOC(CH_3)=CH_2$, $F(CF_2)_6CH_2OCOCH=CH_2$, $F(CF_2)_6CH_2CH_2OCOC(Cl)=CH_2$, $F(CF_2)_4CH_2CH_2OCOC(CH_3)=CH_2$, $F(CF_2)_4CH_2CH_2OCOCH=CH_2$, $F(CF_2)_4CH_2CH_2OCOC(Cl)=CH_2$, $F(CF_2)_6CH_2OCOC(CH_3)=CH_2$, $F(CF_2)_6CH_2OCOCH=CH_2$, $F(CF_2)_6CH_2OCOC(Cl)=CH_2$.

Monomer (a2) or (b2):

Monomer (a2) or (b2) is vinylidene chloride or vinylidene fluoride.

When a copolymer has monomer (a2) units or monomer (b2) units, the copolymer is excellent in affinity to a substrate and in film forming property. Therefore, even if a substrate after immersion in the water/oil repellent composition is air-dried, the copolymer tends to penetrate extensively even to portions where a coating film is hardly formed by the copolymer such as between fibers in the fabric, whereby a uniform film is considered to be formed by the copolymer.

Monomer (a2) units in the copolymer (A) and monomer (b2) units in the copolymer (B) may, respectively, be either vinylidene chloride units or vinylidene fluoride units, or both of them.

In the copolymer (A) and the copolymer (B) coexisting in the water/oil repellent composition, the monomer (a2) units and the monomer (b2) units may be the same or different from each other. From the viewpoint of compatibility of the copolymer (A) and the copolymer (B), they are preferably the same.

Monomer (a3) or (b3):

Monomer (a3) or (b3) is a (meth) acrylate having a saturated hydrocarbon group having at least 12 carbon atoms. It does not have a polyfluoroalkyl group ($R^f$ group). Monomer (a3) or (b3) contributes to water/oil repellency and adhesion between a coating film formed by the water/oil repellent composition and the moisture-permeable waterproofing film substrate formed by a coating liquid. The reason is considered to be such that the affinity between the hydrocarbon groups is a high and because of the hydrophobicity.

Monomer (b3) units in the copolymer (B) may be of one type, or may be of two or more types.

In a case where monomer (a3) units are contained in the copolymer (A), the monomer (a3) units may be of one type, or may be of two or more types.

In a case where monomer (a3) units are contained in the copolymer (A), in the copolymer (A) and the copolymer (B) coexisting in the water/oil repellent composition, the monomer (a3) units and the monomer (b3) units may be the same or different from each other.

The number of carbon atoms in the saturated hydrocarbon group in the monomer (a3) or (b3), is at least 12, preferably at least 16, more preferably at least 18. When it is at least 16, the copolymer (A) or (B) is excellent in water repellency. The upper limit of the number of carbon atoms is preferably at most 30, more preferably at most 24, whereby the melting point is relatively low and handling is easy.

The saturated hydrocarbon group in the monomer (a3) or (b3), may be a linear or branched alkyl group or may be a monocyclic or polycyclic cycloalkyl group.

As the monomer (a3) or (b3), the following compounds may be mentioned.

Lauryl (meth)acrylate, cetyl (meth)acrylate, stearyl (meth)acrylate, and behenyl (meth)acrylate.

Monomer (a4) or (b4):

Monomer (a4) or (b4) is vinyl chloride.

By the presence of monomer (a4) units or monomer (b4) units, the strength of a coating film formed by the water/oil repellent composition will be improved, and in particular, the adhesion between the coating film and the substrate will be improved.

Monomer (a5) or (b5):

Monomer (a5) or (b5) is a monomer having no $R^f$ group and having a crosslinkable functional group. By the presence of monomer (a5) units or monomer (b5) units, the moisture permeable waterproofing film tends to be hardly peeled, and the article having a water/oil repellent-treated porous substrate will be excellent in washing durability.

Monomer (a5) units in the copolymer (A) may be of one type, or may be of two or more types. Monomer (b5) units in the copolymer (B) may be of one type, or may be of two or more types.

In a case where monomer (a5) units are contained in the copolymer (A) and monomer (b5) units are contained in the copolymer (B) in the water/oil repellent composition, they may be the same or different from each other. They are preferably different from the viewpoint of adhesion to the substrate.

The crosslinkable functional group is preferably a functional group having at least one bond among a covalent bond, an ionic bond and a hydrogen bond, or a functional group capable of forming a crosslinked structure by interaction of such bonds. Further, it may be a functional group having an active organic group or an element such as hydrogen or halogen in its molecule.

As the functional group, a hydroxy group, an isocyanate group, a blocked isocyanate group, an alkoxysilyl group, an amino group, an N-hydroxymethylamido group, an N-alkoxymethyl amido group, a silanol group, an ammonium group, an amido group, an epoxy group, an oxazoline group, a carboxy group, an alkenyl group, a sulfo group, or the like, is preferred, and particularly preferred is a hydroxy group, a blocked isocyanate group, an amino group, an N-hydroxymethyl amido group, an epoxy group or a carboxy group, which is capable of reacting directly, or via another compound (such as water), with an isocyanate group of an urethane resin constituting the moisture-permeable waterproofing film or with an amino group or an isocyanate group of a thermosetting agent as described below.

As monomer (a5) or (b5), a (meth) acrylate, an acrylamide, a vinyl ether, or a vinyl ester is preferred.

As monomer (a5) or (b5), the following compounds may be mentioned.

(Meth)acrylates: glycidyl (meth)acrylate, 2-hydroxyethyl (meth)acrylate, 2-hydroxypropyl (meth)acrylate, 4-hydroxybutyl (meth)acrylate, 3-chloro-2-hydroxypropyl (meth)acrylate, dimethylaminoethyl (meth)acrylate, diethylaminoethyl (meth)acrylate, dimethylaminopropyl (meth) acrylate, a polycaprolactone ester of hydroxyethyl (meth) acrylate (trade name: "PLACCEL" FA, FM series, manufactured by Daicel Chemical Industries, Ltd.), 2-isocyanatoethyl (meth)acrylate, 3-isocyanatopropyl (meth) acrylate, 4-isocyanatomethyl-butyl (meth)acrylate, a 2-butanone oxime adduct of 2-isocyanatoethyl (meth)acrylate, a pyrazole adduct of 2-isocyanatoethyl (meth)acrylate, a 3,5-dimethylpyrazole adduct of 2-isocyanatoethyl (meth)acrylate, a 3-methylpyrazole adduct of 2-isocyanatoethyl (meth)acrylate, an ε-caprolactam adduct of 2-isocyanatoethyl (meth)acrylate, a 2-butanone oxime adduct of 3-isocyanatopropyl (meth)acrylate, a pyrazole adduct of 3-isocyanatopropyl (meth)acrylate, a 3,5-dimethylpyrazole adduct of 3-isocyanatopropyl (meth)acrylate, a 3-methylpyrazole adduct of 3-isocyanatopropyl (meth)acrylate, an ε-caprolactam adduct of 3-isocyanatopropyl (meth)acrylate, a 2-butanone oxime adduct of 4-isocyanatobuthyl (meth) acrylate, a pyrazole adduct of 4-isocyanatobutyl (meth)acrylate, a 3,5-dimethylpyrazole adduct of 4-isocyanatobutyl (meth) acrylate, a 3-methylpyrazole adduct of 4-isocyanatobutyl (meth) acrylate, and an ε-caprolactam adduct of 4-isocyanatobutyl (meth)acrylate.

Acrylamides: (meth)acrylamide, N-methyl (meth)acrylamide, N-methylol (meth)acrylamide, N-butoxymethyl (meth)acrylamide, methoxymethyl (meth)acrylamide, ethoxymethyl (meth)acrylamide, butoxymethyl (meth)acrylamide, diacetone (meth)acrylamide.

3-Methacryloyloxy propyl trimethoxy silane, trimethoxy vinyl silane, vinyl trimethoxy silane.

(Meth)acryloyloxyethyl trimethylammonium chloride, (meth)acryloyloxy propyl trimethylammonium chloride, (meth)acrylamido-ethyl trimethyl ammonium chloride, (meth)acrylamido propyl trimethyl ammonium chloride.

Vinyl ethers: 2-chloroethyl vinyl ether, 2-hydroxyethyl vinyl ether, 3-hydroxypropyl vinyl ether, 2-hydroxypropyl vinyl ether, 2-hydroxy isopropyl vinyl ether, 4-hydroxybutyl vinyl ether, 4-hydroxycyclohexyl vinyl ether, hexamethylene glycol monovinyl ether, 1,4-cyclohexanedimethanol monovinyl ether, diethylene glycol monovinyl ether, triethylene glycol monovinyl ether, dipropylene glycol monovinyl ether, glycidyl vinyl ether, 2-aminoethyl vinyl ether, 3-aminopropyl vinyl ether, 2-aminobutyl vinyl ether, allyl vinyl ether.

As monomer (a5) or (b5), inter alia, (meth) acrylates, and acrylamides are preferred, and specifically, a 3,5-dimethylpyrazole adduct of 2-isocyanatoethyl (meth)acrylate, a 2-butanone oxime adduct of 2-isocyanatoethyl (meth)acrylate, 2-hydroxyethyl (meth)acrylate, N-methylol (meth)acrylamide, glycidyl (meth)acrylate, 3-chloro-2-hydroxypropyl methacrylate, glycerol mono(meth)acrylate, and a polycaprolactone ester of hydroxyethyl (meth) acrylate (trade name: "PLACCEL", FA and FM series manufactured by Daicel Chemical Industries, Ltd.) are preferred.

Monomer (a6) or (b6):

Monomer (a6) or (b6) is a monomer other than monomer (a1) or (b1), monomer (a2) or (b2), monomer (a3) or (b3), monomer (a4) or (b4), and monomer (a5) or (b5).

As monomer (a6) or (b6), a (meth) acrylate or an unsaturated carboxylic acid ester is, for example, preferred.

The (meth)acrylate is preferably an alkyl (meth)acrylate having an alkyl group having at most 11 carbon atoms, or a cycloalkyl (meth)acrylate having a monocyclic or polycyclic $C_{5-11}$ cycloalkyl group.

The unsaturated carboxylic ester is preferably an unsaturated monocarboxylic acid monoalkyl ester or unsaturated dicarboxylic acid dialkyl ester having a $C_{1-12}$ alkyl group. Including other compounds, the following compounds may be mentioned as monomer (a6) or (b6).

(Meth)acrylates: methyl (meth)acrylate, ethyl (meth)acrylate, propyl (meth)acrylate, n-butyl (meth)acrylate, t-butyl (meth)acrylate, i-butyl (meth)acrylate, cyclohexyl (meth) acrylate, 2-ethylhexyl (meth)acrylate, n-hexyl (meth)acrylate, benzyl (meth)acrylate, octyl (meth)acrylate, isobornyl (meth)acrylate, dicyclopentanyl (meth)acrylate, dicyclopentenyl (meth)acrylate, a (meth)acrylate having a repeating structure of siloxane bonds in the side chain, and a (meth) acrylate having a urethane bond.

Unsaturated carboxylic acid esters: an alkyl ester of crotonic acid, diethyl maleate, dipropyl maleate, an alkyl ester of maleic acid such as dioctyl maleate, diethyl fumarate, an alkyl ester of fumaric acid such as dipropyl fumarate, an alkyl ester of citraconic acid, an alkyl ester of mesaconic acid, and allyl acetate.

Other: N-vinylcarbazole, maleimide, N-methyl maleimide, and vinyl pyrrolidone.

As the combination of monomer units for the copolymer (A), with a view to developing water/oil repellency and preventing penetration of a coating resin in the process for forming a moisture-permeable waterproofing film, preferred is a combination of monomer (a1) units: units of a (meth) acrylate having a $C_{4-6}$ $R^F$ group, monomer (a2) units: units of vinylidene chloride, monomer (a4) units, and monomer (a5) units in the above-described preferred embodiment, or a combination of monomer (a1) units: units of an acrylate having a $C_{4-6}$ $R^F$ group and having its 2-position substituted by a chlorine atom (i.e. $R^2$ is a chlorine atom), monomer (a2) units: units of vinylidene chloride, monomer (a4) units, and monomer (a5) units in the above-described preferred embodiment.

Or, with a view to ensuring miscibility with the copolymer (B) and satisfying both the development of water/oil repellency and the property to prevent penetration of the coating resin, preferred is a combination of monomer (a1) units: units of (meth)acrylate having a $C_{4-6}$ $R^F$ group, monomer (a2) units: units of vinylidene chloride, monomer (a3) units, and monomer (a6) units in the above-described preferred embodiment, or a combination of monomer (a1) units: units of an acrylate having a $C_{4-6}$ $R^F$ group and having its 2-position substituted with a chlorine atom, monomer (a2): units of vinylidene chloride, monomer (a3) units, and monomer (a6) units in the above-described preferred embodiment.

As the combination of monomer units for the copolymer (B), with a view to the development of water/oil repellency and preventing peeling of a formed moisture-permeable waterproofing film, preferred is a combination of monomer (b1) units: units of a (meth) acrylate having a $C_{4-6}$ $R^F$ group, monomer (b2) units: units of vinylidene chloride, monomer (b3) units, monomer (b4) units and monomer (b5) units in the above-described preferred embodiment, or a combination of monomer (b1) units: units of an acrylate having a $C_{4-6}$ $R^F$ group and having its 2-position substituted with a chlorine atom, monomer (b2) units: units of vinylidene chloride, monomer (b3) units, monomer (b4) units and monomer (b5) units in the above-described preferred embodiment.

Or, with a view to preventing penetration of the coating resin in the process for forming a moisture-permeable waterproofing film and preventing peeling of a formed moisture-permeable waterproofing film, preferred is a combination of monomer (b1) units: units of a (meth) acrylate having a $C_{4-6}$ $R^F$ group, monomer (b2) units: units of vinylidene chloride, monomer (b3) units, monomer (b4) units and monomer (b6) units in the above-described preferred embodiment, or a combination of monomer (b1) units: units of an acrylate having a $C_{4-6}$ $R^F$ group and having its 2-position substituted with a chlorine atom, monomer (b2) units: units of vinylidene chloride, monomer (b3) units, monomer (b4) units and monomer (b6) units in the above-described preferred embodiment.

In the copolymer (A), the content of monomer (a1) units is from 40 to 95 mass %, preferably from 45 to 95 mass %, more preferably from 45 to 91 mass %, in all monomer units (100 mass %) in the copolymer (A).

The content of monomer (a2) units is from 1 to 60 mass %, preferably from 1 to 51 mass %, more preferably from 5 to 51 mass %, in all monomer units (100 mass %) in the copolymer (A).

The content of monomer (a3) units is less than 5 mass %, preferably at most 4 mass %, more preferably at most 3 mass %, further preferably at most 2 mass %, particularly preferably at most 1 mass %, most preferably not to contain (a3) units, in all monomer units (100 mass %) in the copolymer (A). Here, in the case of containing (a3) units, the lower limit value of the content of (a3) units is preferably 0.1 mass %, more preferably 0.3 mass %.

The content of monomer (a4) units is at most 15 mass %, preferably at most 10 mass % or may be zero, in all monomer units (100 mass %) in the copolymer (A). When monomer (a4) units are to be incorporated, the content is preferably at least 1 mass %, more preferably at least 3 mass %, so that the effects of adding them are easily obtainable.

The content of monomer (a5) units is at most 10 mass %, preferably at most 5 mass %, or may be zero, in all monomer units (100 mass %) in the copolymer (A). When monomer (a5) units are to be incorporated, the content is preferably at least 0.1 mass %, more preferably at least 0.5 mass %, so that the effects of adding them are easily obtainable.

The content of monomer (a6) units is at most 30 mass %, preferably at most 20 mass %, or may be zero, in all monomer units (100 mass %) in the copolymer (A). When monomer (a6) units are to be incorporated, the content is preferably at least 5 mass %, more preferably at least 10 mass %, so that the effects of adding them are easily obtainable.

In the copolymer (B), the content of monomer (b1) units is from 40 to 91 mass %, preferably from 45 to 91 mass %, more preferably from 45 to 85 mass %, in all monomer units (100 mass %) in the copolymer (B).

The content of monomer (b2) units is from 2 to 20 mass %, preferably from 2 to 19 mass %, more preferably from 3 to 19 mass % in all monomer units (100 mass %) in the copolymer (B).

The content of monomer (b3) units is from 5 to 20 mass %, preferably from 5 to 18 mass %, more preferably from 5 to 15 mass %, in all monomer units (100 mass %) in the copolymer (B).

The content of monomer (b4) units is from 2 to 20 mass %, preferably from 2 to 18 mass %, more preferably from 7 to 18 mass %, in all monomer units (100 mass %) in the copolymer (B).

The content of monomer (b5) units is at most 10 mass %, preferably at most 5 mass %, or may be zero, in all monomer units (100 mass %) in the copolymer (B). When monomer (b5) units are to be incorporated, the content is preferably at least 0.1 mass %, more preferably at least 0.5 mass %, so that the effects of adding them are easily obtainable.

The content of monomer (b6) units is at most 30 mass %, preferably at most 20 mass %, or may be zero, in all monomer units (100 mass %) in the copolymer (B). When monomer (b6) units are to be incorporated, the content is preferably at least 5 mass %, more preferably at least 10 mass %, so that the effects of adding them are easily obtainable.

With respect to the copolymer (A) and the copolymer (B) coexisting in the water/oil repellent composition, the respective weight average molecular weights (Mw) and number-average molecular weights (Mn) are preferably different, as mentioned above, and similarly the respective monomer compositions are preferably sufficiently different. Specifically, the difference between the content (mass %) of monomer (a3) units in the copolymer (A) and the content (mass %) of monomer (b3) units in the copolymer (B) is preferably at least 1 (mass %), more preferably at least 2 (mass %), further preferably at least 3 (mass %). For example, in a case where the content of monomer (b3) units in the copolymer (B) is 5 mass %, as mentioned above, the content of monomer (a3) units in the copolymer (A) is at most 4 mass %, more preferably at most 3 mass %, further preferably at most 2 mass %.

With respect to the copolymer (A) and the copolymer (B) coexisting in the water/oil repellent composition, a combination is also preferred wherein monomer (a1) and monomer (b1) are different monomers. That is, it is preferred that $R^2$ in either the units based on monomer (a1)) in the copolymer (A) or the units based on monomer (b1) in the copolymer (B) is a hydrogen atom or a methyl group, and $R^2$ in the other is a fluorine atom or a chlorine atom, particularly preferably a chlorine atom. For example, a combination of a copolymer (A) wherein the units based on monomer (a1) are units based on a methacrylate and a copolymer (B) wherein the units based on monomer (b1) are units based on a 2-chloroacrylate, or a combination of a copolymer (A) wherein the units based on monomer (a1) are units based on a 2-chloroacrylate and a copolymer (B) wherein the units based on monomer (b1) is are units based on a methacrylate, may be mentioned.

The copolymer (A) and the copolymer (B) coexisting in the water/oil repellent composition are preferably different from each other in at least one of the following three points i.e. that the mass average molecular weight (Mw) or the number average molecular weight (Mn) in the copolymer (A) is different from the mass average molecular weight (Mw) or the number average molecular weight (Mn) in the copolymer (B), that the content (mass %) of monomer (a3) units in the copolymer (A) is sufficiently different from the content (mass %) of monomer (b3) units in the copolymer (B), and that units based on monomer (a1) in the copolymer (A) are different from units based on monomer (b1) in the copolymer (B).

It is sufficient that the copolymer (A) and the copolymer (B) coexisting in the water/oil repellent composition are different in one of the above three points, and they are not required to be different in other two points. For example, in a case where the copolymer (A) and the copolymer (B) coexisting in the water/oil repellent composition are different in that the mass average molecular weight (Mw) or the number average molecular weight (Mn) in the copolymer (A) is different from the mass average molecular weight (Mw) or the number average molecular weight (Mn) in the copolymer (B), the difference between the content (mass %) of the monomer (a3) units in the copolymer (A) and the content (mass %) of the monomer (b3) in the copolymer (B) may be less than 1 (mass %), and the units based on monomer (a1) and the units based on monomer (b1) may be the same. Likewise, in a case where the units based on monomers (a1) in the copolymer (A) and the units based on monomer (b1) in the copolymer (B) are different, the mass average molecular weight (Mw) or number-average molecular weight (Mn) of the copolymer (A) may be the same as the mass average molecular weight Mw) or number-average molecular weight (Mn) of the copolymer (B), or the mass average molecular weight (Mw) or number-average molecular weight (Mn) of the copolymer (A) may be smaller than the mass average molecular weight (Mw) or number-average molecular weight (Mn) of the copolymer (B).

As described above, it is preferred that the copolymer (A) and the copolymer (B) coexisting in the water/oil repellent composition are sufficiently different, so that the water/oil repellent composition of the present invention prevents penetration of a coating liquid for forming a moisture-permeable waterproofing film and sufficiently exhibits the effect of preventing peeling of the moisture-permeable waterproofing film. If the copolymer (A) and the copolymer (B) coexisting in the water/oil repellent composition are substantially the same copolymers, it may not be possible to sufficiently obtain such effects of the present invention.

(Method for Producing Copolymers)

The copolymer (A) and the copolymer (B) are produced, for example, by a method of polymerizing the monomer components including the above respective monomers in a liquid medium in the presence of a polymerization initiator to obtain a solution, dispersion or emulsion of each copolymer.

The polymerization method may, for example, be a solution polymerization method, a dispersion polymerization method, an emulsion polymerization method or a suspension polymerization method, and emulsion polymerization is preferred. Further, the polymerization method may be polymerization all at once or multistage polymerization.

The method for producing the copolymer (A) and the copolymer (B) is preferably a method of polymerizing the monomer components including the above respective monomers by emulsion polymerization in an aqueous medium in the presence of a surfactant and a polymerization initiator to obtain an emulsion of each copolymer.

With a view to improving the yield of the copolymer, it is preferred to pre-emulsify a mixture comprising the monomers, the surfactant and the aqueous medium, prior to the emulsion polymerization. For example a mixture comprising the monomers, the surfactant and the aqueous medium is mixed and dispersed by an ultrasonic stirring apparatus, a homomixer or a high pressure emulsifier.

Polymerization Initiator:

The polymerization initiator may, for example, be a thermal polymerization initiator, a photopolymerization initiator, a radiation polymerization initiator, a radical polymerization initiator or an ionic polymerization initiator, and a water-soluble or oil-soluble radical polymerization initiator is preferred.

As the radical polymerization initiator, a common initiator such as an azo type polymerization initiator, a peroxide type polymerization initiator or a redox type initiator is employed depending upon the polymerization temperature. As the radical polymerization initiator, an azo type compound is particularly preferred, and in a case where polymerization is carried out in an aqueous medium, a salt of an azo type compound is more preferred. The polymerization temperature is preferably from 20 to 150° C.

The amount of the polymerization initiator is preferably from 0.05 to 5 parts by mass, more preferably from 0.05 to 2 parts by mass, per 100 parts by mass of the monomer components.

Molecular Weight-Controlling Agent:

At the time of polymerization of the monomer components, a molecular weight-controlling agent may be employed. The molecular weight-controlling agent is preferably an aromatic compound, a mercapto alcohol or a mercaptan, particularly preferably an alkylmercaptan.

The amount of the molecular weight-controlling agent to be added is properly adjusted so that Mw and Mn of the obtainable copolymer will be within the above ranges.

Liquid Medium:

As the liquid medium, the after-mentioned liquid medium (C) may be mentioned, and an aqueous medium is preferred.

The aqueous medium may be the same aqueous medium as mentioned hereinafter, and the preferred embodiment is also the same.

Surfactant:

The surfactant may be the after-mentioned surfactant (D), and the preferred embodiment is also the same.

The proportion of the monomers in the monomer components is the same as the proportion of the monomer units in the copolymer since substantially 100% of the monomers are polymerized, and the preferred embodiment is also the same.

The solid content concentration of the emulsion is preferably from 20 to 40 mass % in the emulsion (100 mass %) immediately after production of the copolymer. Further, the solid content concentration is a concentration containing the surfactant in addition to the copolymer. The content of the copolymer in the emulsion is preferably from 18 to 40 mass % immediately after production of the copolymer.

The solid content concentration of the emulsion is calculated from the mass of the emulsion before heating and the mass after drying for 4 hours by a counter current canal dryer at 120° C.

(Liquid Medium (C))

The liquid medium (C) may, for example, be water, an alcohol (such as an alkanoyl, an alkylene glycol or a polyalkylene glycol), a monoalkyl ether of a polyhydric alcohol, a halogen compound, a hydrocarbon, a ketone, an ester, an ether, a nitrogen compound, a sulfur compound, an inorganic solvent or an organic acid.

The alcohol is preferably an alkanoyl having at most 6 carbon atoms, a dihydric alcohol (such as an alkylene glycol) having at most 4 carbon atoms, or a multimer of a dihydric alcohol having at most 4 carbon atoms (such as a dialkylene glycol or a trialkylene glycol). The monoalkyl ether of a polyhydric alcohol is preferably a monoalkyl ether of an alkylene glycol having at most 4 carbon atoms or its multimer polyalkylene glycol, in which the alkyl group has from 1 to 4 carbon atoms.

The liquid medium (C) is preferably an aqueous medium in view of the solubility and the handling efficiency.

The aqueous medium may be water or water containing a water-soluble organic solvent.

The water-soluble organic solvent may, for example, be tert-butanol, 3-methoxymethylbutanol, propylene glycol, dipropylene glycol, dipropylene glycol monomethyl ether or tripropylene glycol, and is preferably dipropylene glycol, tripropylene glycol or dipropylene glycol monomethyl ether.

In a case where the aqueous medium contains the water-soluble organic solvent, the content of the water-soluble organic solvent is preferably from 1 to 80 parts by mass, more preferably from 10 to 60 parts by mass per 100 parts by mass of water.

(Surfactant (D))

The surfactant (D) may, for example, be a hydrocarbon type surfactant or a fluorinated surfactant, and each of which may, for example, be an anionic surfactant, a nonionic surfactant, a cationic surfactant, or an amphoteric surfactant. As the surfactant (D), from the viewpoint of the compatibility with additives, it is preferred to use a nonionic surfactant and an amphoteric surfactant in combination, and from the viewpoint of the adhesion, it is preferred to use a nonionic surfactant alone or to use a nonionic surfactant and a cationic surfactant in combination. The ratio of the nonionic surfactant to the cationic surfactant (nonionic surfactant/cationic surfactant) is preferably from 97/3 to 40/60 (mass ratio).

The nonionic surfactant is preferably at least one member selected from the group consisting of surfactants $s^1$ to $s^6$ as disclosed in Patent Documents 1 and 2.

In a case where the surfactant (D) contains a cationic surfactant, such a cationic surfactant is preferably surfactant $s^7$ as disclosed in Patent Documents 1 and 2.

In a case where the surfactant (D) contains an amphoteric surfactant, such an amphoteric surfactant is preferably surfactant $s^8$ as disclosed in Patent Documents 1 and 2.

Further, as the surfactant (D), surfactant $s^9$ (polymer surfactant) as disclosed in Patent Documents 1 and 2 may also be used.

The preferred embodiment of the surfactant (D) is the same as the preferred embodiment disclosed in Patent Documents 1 and 2.

The nonionic surfactant is preferably

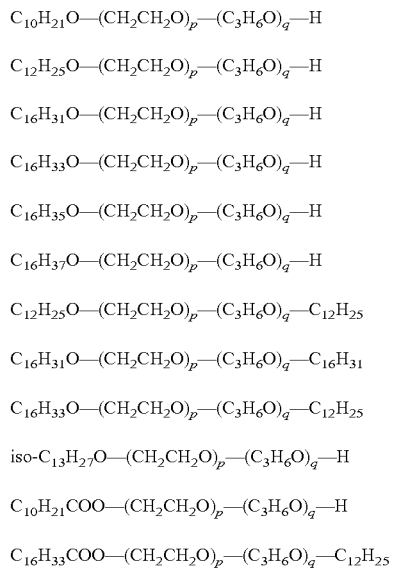

[in the formulae, p may be a number of at least 3 (e.g. from 5 to 200), and q may be a number of at least 2 (e.g. from 5 to 200)]. The cationic surfactant is preferably e.g. monostearyl trimethylammonium chloride, monostearyl dimethyl monoethyl ammonium ethyl sulfate, mono(stearyl) monomethyldi(polyethylene glycol) ammonium chloride, monofluorohexyl trimethyl ammonium chloride, di(tallow alkyl) dimethylammonium chloride or dimethyl mono coconut amine acetate, and the amphoteric surfactant is preferably e.g. dodecyl betaine, stearyl betaine, dodecyl carboxymethyl hydroxyethyl imidazolinium betaine, dodecyl dimethylamino acetate betaine or fatty acid amide propyl dimethylamino acetic acid betaine.

<Production of Water/Oil Repellent Composition>

By mixing an emulsion containing the copolymer (A) and an emulsion containing the copolymer (B) and further adding optional components such as additives (E), followed by mixing, a water/oil repellent composition is obtainable. It may be diluted by adding a liquid medium (C), as the case requires.

The solid content concentration in the water/oil repellent composition is preferably from 0.2 to 5 mass % in the water/oil repellent composition (100 mass %), at the time of treating the substrate. When the solid content concentration in the water/oil repellent composition is at least 0.2 mass %, the water/oil repellency will be well developed, and when it is at most 5 mass %, penetration of the coating resin in the process for forming a moisture-permeable waterproofing film can be well prevented.

The solid content concentration of the water/oil repellent composition is a value calculated from the mass of the water/oil repellent composition before heating and the mass after being dried for 4 hours at 120° C. by a convection dryer.

Further, the pH of the water/oil repellent composition is adjusted as the case requires. The pH of the water/oil repellent composition is preferably from 3.0 to 7.0, more preferably from 3.0 to 6.0. When the pH of the water/oil repellent composition is at least the lower limit value in the above range, the interaction with the porous substrate will be increased thereby to stabilize the adhesion amount of the water/oil repellent composition, and when it is at most the upper limit value, the stability of the water/oil repellent composition will be secured.

Specifically, by incorporating a pH-adjusting agent such as acetic acid, hydrochloric acid, hydrobromic acid, phosphoric acid, formic acid, propionic acid, butyric acid, isobutyric acid, valeric acid, isovaleric acid, oxalic acid, malonic acid, succinic acid, glutaric acid, adipic acid, lactic acid, malic acid, citric acid, ascorbic acid, or gluconic acid, to the water/oil repellent composition, the pH is adjusted to a desired level.

(Additives (E))

The additives include, for example, a penetrant, a defoamer, a water-absorbing agent, an antistatic agent, an antistatic polymer, an anticrease agent, a texture-adjusting agent, a film-forming assistant, a water-soluble polymer (such as polyacrylamide or polyvinyl alcohol), a thermosetting agent (such as a melamine resin, a urethane resin, a triazine ring-containing compound or an isocyanate-type compound), an epoxy curing agent (such as isophthalic acid dihydrazide, adipic acid dihydrazide, sebacic acid dihydrazide, dodecanedioic acid dihydrazide, 1,6-hexamethylenebis (N,N-dimethylsemicarbazide), 1,1,1',1'-tetramethyl-4,4'-(methylene-di-p-phenylene) disemicarbazide or spiroglycol), a thermosetting catalyst, a crosslinking catalyst (such as an organic acid or ammonium chloride), a synthetic resin, a fiber-stabilizer and inorganic fine particles.

Further, the water/oil repellent composition of the present invention may contain another copolymer (G) capable of exhibiting water repellency and/or oil repellency (e.g. a commercially available water repellent, a commercially available oil repellent, a commercially available water/oil repellent or a commercially available SR (soil release) agent) other than the copolymer (A) and the copolymer (B), a water-repellent compound having no fluorine atom, or the like as the case requires. The water-repellent compound having no fluorine atom may, for example, be a paraffin type compound, an aliphatic amide type compound, an alkylethylene urea compound or a silicone compound.

(Proportions of Components in Water/Oil Repellent Composition)

The content of the copolymer (A) is preferably from 20 to 90 mass %, more preferably from 30 to 90 mass %, further preferably from 40 to 80 mass %, particularly preferably from 60 to 80 mass %, most preferably from 60 to 75 mass %, in the total (100 mass %) of the copolymer (A) and the copolymer (B). When the proportion of the copolymer (A) is at least 20 mass %, the water/oil repellency will be good, and penetration of the coating liquid for forming a moisture-permeable waterproofing film can be suppressed.

The content of the copolymer (B) is preferably from 10 to 80 mass %, more preferably from 10 to 70 mass %, further preferably from 20 to 60 mass %, particularly preferably from 20 to 40 mass %, most preferably from 25 to 40 mass % in the total (100 mass %) of the copolymer (A) and the copolymer (B). When the proportion of the copolymer (B) is at least 10 mass %, peeling of the moisture-permeable waterproofing film can be prevented.

In a case where the water/oil repellent composition contains a surfactant (D), the content of the surfactant (D) is preferably from 1 to 10 parts by mass, more preferably from 1 to 9 parts by mass, particularly preferably from 1 to 7 parts by mass, relative to the total (100 parts by mass) of the copolymer (A) and the copolymer (B).

Advantageous Effects

In the water/oil repellent composition of the present invention as described above, by blending the copolymer (B) containing monomer (b3) units with the copolymer (A) not substantially containing monomer (a3) units, in a specific ratio, it is possible to obtain a porous substrate and an article, which have good water/oil repellency and which satisfy both prevention of penetration of a coating liquid for forming a moisture-permeable waterproofing film and prevention of peeling of the moisture-permeable waterproofing film.

This is considered to be such that in the cured product of the water/oil repellent composition, the monomer (a3) and (b3) units, while contributing to improvement in adhesion to the moisture-permeable waterproofing film formed by the coating liquid, have low resistance to the solvent in the coating liquid and thus are likely to cause penetration of the coating liquid.

Further, in the water/oil repellent composition of the present invention, neither the copolymer (A) nor the copolymer (B) has units of a monomer having an $R^F$ group having at least 7 carbon atoms, whereby the content (content in a case where the solid content concentration is 20 mass %) of perfluorooctanoic acid (PFOA) and perfluorooctanesulfonic acid (PFOS), and their precursors and analogues, of which the effects on the environment are pointed out, can be reduced to a level of not higher than the detection limit as an analytical value of LC-MS/MS by the method disclosed in WO2009/081822.

(Applications)

The water/oil repellent composition of the present invention is useful for water/oil repellent treatment of a substrate. In particular, it is useful as a water/oil repellent at the time of producing an article by forming a moisture-permeable waterproofing film after treating the substrate with the water/oil repellent.

The substrate to be treated may, for example, be fibers (natural fibers, synthetic fibers, mixed fibers, etc.), fabric (woven fabric, textile fabric, nonwoven fabric, etc.), various fiber products (clothing (sports wears, coats, jackets, work clothes, uniforms, etc.), bags, industrial materials, etc.), resin products, paper, leathers, metal products, stone products, concrete products, gypsum products and glass products.

The substrate is preferably a porous substrate. The porous substrate includes fabric (woven fabric, textile fabric, nonwoven fabric, etc.), porous fiber products such as clothing, a porous resin sheet, pumice and wood. Particularly, fabric are preferred.

The treatment method may, for example, be a method of coating the substrate with a coating liquid containing the water/oil repellent composition by a known coating method, followed by drying, or a method of dipping the substrate in a coating liquid containing the water/oil repellent composition, followed by drying.

Unless the porous substrate such as cloth is not particularly thick, usually, both surfaces of the porous substrate treated by the above method will be water/oil repellent-treated surfaces. In a case where the porous substrate is particularly thick or the water/oil repellency on one side of the treated porous substrate is inadequate for such a reason that penetration of the water/oil repellent composition is inadequate, such a surface may further be treated with the water/oil repellent composition. Further, the treated porous substrate may be a porous substrate wherein only one side is a water/oil repellent-treated surface.

Further, after treatment with the water/oil repellent composition of the present invention, antistatic finish, softening finish, antibacterial finish, deodorant finish or waterproofing finish may, for example, be carried out. Such finish treatment may be applied on one side of a porous substrate wherein both surfaces are water/oil repellent-treated surfaces, or on a surface which is not a water/oil repellent-treated surface, of a porous substrate wherein only one side is the water/oil repellent-treated surface.

<Article>

The article of the present invention is an article having a porous substrate, and the porous substrate has a water/oil repellent-treated surface treated with the water/oil repellent composition on one side, and a moisture-permeable waterproofing film on one side. It may, for example, be cloth having a water/oil repellent-treated surface on one side and having a moisture-permeable waterproofing film on the other side not water/oil repellent-treated, or a clothing obtained by using such fabric. Further, it may also be cloth having water/oil repellent-treated surfaces on both sides and having a moisture-permeable waterproofing film on one water/oil repellent-treated surface, or a clothing obtained by using such cloth. As the article of the present invention, particularly preferred is an article having water/oil repellent-treated surfaces on both sides of the treated porous substrate and having the moisture-permeable waterproofing film on one of the water/oil repellent-treated surfaces.

The moisture-permeable waterproofing film may, for example, be a microporous polyurethane resin film, a non-porous polyurethane resin thin film or an acrylic resin coating film.

The present invention further provides a process for producing an article, which comprises treating at least one side of a porous substrate with the water/oil repellent composition to form a water/oil repellent-treated surface, and then applying a coating liquid containing a material for a moisture-permeable waterproofing film to one side of the porous substrate to form a moisture-permeable waterproofing film. By such a process, it is possible to obtain an article having a porous substrate having a water/oil repellent-treated surface and a moisture-permeable waterproofing film.

Specifically, for example, an article having a porous substrate having a water/oil repellent-treated surface and a moisture-permeable waterproofing film, is produced by a process of subjecting one side of the porous substrate to water/oil repellent treatment and then forming the moisture-permeable waterproofing film on a side not water/oil repellent-treated, or a process of subjecting both sides of the porous substrate to water/oil repellent treatment, and then forming the moisture-permeable waterproofing film on one of the water/oil repellent-treated surfaces. Particularly preferred is the process of subjecting both sides of the porous substrate to water/oil repellent treatment, and then forming the moisture-permeable waterproofing film on one of the water/oil repellent-treated surfaces.

The porous substrate is preferably fabric, and the moisture-permeable waterproofing film is preferably a microporous polyurethane resin film, a non-porous polyurethane film or a microporous polytetrafluoroethylene resin film.

The coating liquid is one containing a material for the moisture-permeable waterproofing film, the solvent, etc. The resin to be used for forming the moisture-permeable waterproofing film is not particularly limited, but, for example, a polyester copolymer type, polyether copolymer type or polycarbonate copolymer type polyurethane resin, a polyurethane resin obtained by copolymerizing silicone, fluorine, amino acid, etc., an acrylic resin, a synthetic rubber, or a vinyl type resin such as polyvinyl chloride, may be preferably used.

In the present invention, from the viewpoint of easy processing, a known polyurethane resin obtainable by reacting a polyisocyanate component and a polyol component, is preferred. As the polyisocyanate component, an aromatic diisocyanate, an aliphatic diisocyanate, an alicyclic diisocyanate, etc. may be used alone or as mixed. Specifically, tolylene-2,4-diisocyanate, 4,4'-diphenylmethanediisocyanate, 1,6-hexanediisocyanate, 1,4-cyclohexanediisocyanate or the like may be used as the main component, and as the case requires, a tri-functional or higher polyisocyanate may be used. As the polyol component, a polyether polyol, a polyester polyol or the like may be used. As the polyether polyol, polyethylene glycol, polypropylene glycol, polytetraethylene glycol or the like may be used. As the polyester polyol, a reaction product of a diol such as ethylene glycol or propylene glycol and a dibasic acid such as adipic acid or sebacic acid, or a ring-opening polymer of e.g. caprolactone may be used, and needless to say, a polymer of an oxyacid monomer or a prepolymer thereof may be used.

As the solvent, in addition to toluene or methyl ethyl ketone, a polar organic solvent is preferably used, and N,N-dimethylformamide (DMF), N,N-dimethylacetamide, dimethylsulfoxide, N-methylpyrrolidone or hexamethylenephosphonamide may, for example, be mentioned. An assistant such as a fluorinated water repellent or crosslinking agent may be added to the coating resin solution.

The moisture-permeable waterproofing film may be formed, for example, by applying the coating liquid to one surface of the porous substrate, leaving the substrate at rest for a certain time, and then dipping the substrate in water for a predetermined time to remove the solvent, followed by drying. As the coating method, various coating methods such as knife coating, knife over roll coating and reverse roll coating may be employed.

By the above-described process for producing an article having a porous substrate of the present invention, it is possible to obtain an article having a porous substrate having a water/oil repellent-treated surface and a moisture-permeable waterproofing film, which has good water/oil repellency, which is excellent in the design since penetration of the coating liquid for formation of the moisture-permeable waterproofing film or the like is prevented, from which the moisture-permeable waterproofing film is hardly peeled, and which presents a low environmental impact.

EXAMPLES

Now, the present invention will be described in detail with reference to Examples. However, it should be understood that the present invention is by no means restricted thereto.

<Method for Measuring Average Molecular Weight of Copolymer>

With respect to a copolymer separated by the following separation method, the average molecular weight was measured.

[Separation Method for Copolymer]

6 g of an emulsion was dropped to 60 g of 2-propanol (hereinafter referred to as IPA), followed by stirring to precipitate a solid. The mixture was subjected to centrifugal separation at 3,000 rpm for 5 minutes, and the obtained solid was separated. 12 g of IPA was added again, followed by stirring. The mixture was subjected to centrifugal separation at 3,000 rpm for 5 minutes, and the obtained solid was separated from the supernatant liquid and vacuum dried at 35° C. overnight to obtain a copolymer.

[Method for Measuring Average Molecular Weight]

The recovered copolymer was dissolved in a solvent mixture of a fluorinated solvent (trade name: AK-225 manufactured by Asahi Glass Company, Limited)/THF=6/4 (volume ratio) to form a solution having a solid content concentration of 0.5 mass %, which was passed through a 0.2 μm filter to prepare a sample for analysis. With respect to the sample, the number average molecular weight (Mn) and the mass average molecular weight (Mw) were measured. The measuring conditions are as follows.

[Measuring Conditions]

Apparatus: HLC-8220GPC (trade name) manufactured by Tosoh Corporation,

Column: MIXED-C (trade name) and 100A (trade name) manufactured by Polymer Laboratories connected in series, Measurement temperature: 37° C., injected amount: 50 μL, outflow rate: 1 mL/min, standard sample: EasiCal PS-2 (trade name) manufactured by Polymer Laboratories, eluent: a solvent mixture of a fluorinated solvent (AK-225 manufactured by Asahi Glass Company, Limited)/THF=6/4 (volume ratio).

<Evaluation Methods>

[Water Repellency (Initial)]

With respect to a test cloth, the water repellency was evaluated in accordance with the spray test in JIS L1092-1998. The water repellency is represented by five grades of from 1 to 5. The higher the grade number, the better the water repellency. A test specimen with a grade 3 or higher is considered to have water repellency. A grade having +(−) attached shows that the property is slightly better (worse) than the standard property of that grade.

[Water Repellency (after Washing 20 Times)]

With respect to a test specimen, washing was repeated 20 times in accordance with the water washing method in JIS L 0217 appendix 103. After washing, the test cloth was air-dried in a room at a temperature of 25° C. under a humidity of 60% overnight, whereupon the water repellency was evaluated as described above.

[Oil Repellency]

With respect to a test cloth, the oil repellency was evaluated in accordance with the test method in AATCC-TM118-1966. The oil repellency is represented by the grades as shown in Table 1. A grade having +(−) attached shows that the property is slightly better (worse) than the standard property of that grade.

TABLE 1

| Oil repellency No. | Test solution | Surface tension (25° C.) [mN/m] |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 65 Parts of nujol/ 35 parts of hexadecane | 29.6 |
| 1 | Nujol | 31.2 |
| 0 | Less than 1 | — |

[Penetration of Coating Liquid]

Using a colorimeter (CR310 manufactured by KONICA MINOLTA, INC.), before a moisture-permeable waterproofing film was formed by a coating liquid, the brightness of the surface of a test cloth on a side on which a moisture-permeable waterproofing film would not be to be formed, was measured, and after a moisture-permeable waterproofing film was formed, the brightness of the same surface was measured, and their difference (ΔL) was obtained. The smaller the value of the difference (ΔL) in brightness, the better the performance for preventing penetration of the coating liquid.

[Peel Strength of Moisture-Permeable Waterproofing Film]

A heat seal tape (2.5 cm in width, 15 cm in length) was attached by hot press to the moisture-permeable waterproofing film of a test cloth having the moisture-permeable waterproofing film formed by the coating liquid. Using a Tensilon universal testing machine (AGS-X manufactured by Shimadzu Corporation), a force (peel strength, unit: N/10 cm) applied when the attached tape was peeled was measured. Measurement was carried out three times in total, and the average value of the peel strengths was obtained. The higher the value of peel strength, the less likely the peeling of the moisture-permeable waterproofing film formed by the coating liquid.

[Solvent Resistance]

On a test specimen before the formation of a moisture-permeable waterproofing film by the coating liquid, droplets (12 μl) of toluene were left to stand still, to measure the time until the droplets completely permeated. If it took more than 180 seconds, and the measurement was terminated.

The coating liquid for forming a moisture-permeable waterproofing film contains a solvent such as toluene, the permeation of droplets of toluene is an index for the permeability of the coating liquid. The longer the time until the droplets of toluene completely permeated, the better the performance for inhibiting permeation of the coating liquid.

Abbreviations

[Monomer (a1) or (b1)]
 FMA: $F(CF_2)_6CH_2CH_2OC(O)C(CH_3)=CH_2$.
 αFA: $F(CF_2)_6CH_2CH_2OC(O)C(Cl)=CH_2$.
[Monomer (a2) or (b2)]
 VDC: vinylidene chloride.
[Monomer (a3) or (b3)]
 STA: stearyl acrylate.
 BeA: behenyl acrylate.
[Monomer (a4) or (b4)]
 VCM: Vinyl chloride.
[Monomer (a5) or (b5)]
 NMAM: N-methylolacrylamide.
 HEMA: 2-hydroxyethyl methacrylate.
 D-BI: 3,5-dimethylpyrazole adduct of 2-isocyanatoethyl methacrylate.

[Monomer (a6) or (b6)]
 DOM: dioctyl maleate.
 IBMA: isobornyl methacrylate
(Surfactant (D))
 PEO-20: a 10 mass % aqueous solution of polyoxyethylene oleyl ether (ethylene oxide about 26 mol adduct) (trade name: Emulgen E430 manufactured by Kao Corporation),
 PEO-T: polyoxyethylene isotridecyl,
 P204: a 10% aqueous solution of ethylene oxide propylene oxide polymer (containing 40 mass % of ethylene oxide) (PRONONE 204 manufactured by NOF Corporation)
 TMAC: a 10 mass % aqueous solution of stearyl tirmethylammonium chloride (ARQUAD 18-63 manufactured by Lion Corporation).
 DSMAC: distearyl dimethylammonium chloride.
[Liquid Medium (C)]
 DPG: dipropylene glycol
 Water: deionized water
[Molecular Weight-Controlling Agent]
 StSH: stearyl mercaptan
[Polymerization Initiator]
 VA061A: a 10 mass % aqueous solution of 2,2'-azobis[2-(2-imidazolin-2-yl)propane]acetate,
 V-50: 2,2'-azobis(2-methylpropionamidine) dihydrochloride.
[Additives]
 KB1000: silicone softening agent (trade name: HISOFTER KB1000 manufactured by Meisei Chemical Works, Ltd.),
 M-3: melamine resin (trade name: BECKAMINE M-3 manufactured by DIC Corporation), thermosetting agent.
 ACX: melamine resin catalyst (trade name: ACCELERATOR ACX manufactured by DIC Corporation).

<Production of Copolymer>

Production Example 1: Production of Emulsion Containing Copolymer (A1)

An emulsion of the composition as shown in Table 2 was produced.

Into a glass container, monomer (a1) (FMA), monomer (a5) (HEMA), surfactants (PEO-20, P204, TMAC), liquid medium (DPG, water), and a molecular weight controlling agent (StSH) were put and heated at 60° C. for 30 minutes, followed by mixing by a homomixer (trade name: Bio mixer, manufactured by Nippon Seiki Seisakusho Co., Ltd.) to obtain a mixed solution.

While maintaining the obtained mixture at 60° C., the mixture was treated with 40 MPa by a high-pressure emulsifying machine (Minilab manufactured by APV Lanier Co.,) to obtain an emulsified liquid. The obtained emulsified liquid was put into a stainless steel reactor and cooled to at most 40° C.

A polymerization initiator (VA061A) was added thereto, and after the gas phase was replaced with nitrogen, monomer (a2) (VDC) and monomer (a4) (VCM) were introduced to carry out a polymerization reaction at 60° C. for 15 hours with stirring, to obtain an emulsion containing a copolymer (A1).

The composition (unit: parts by mass) and solid content concentration (unit: mass %) of the obtained emulsion are shown in Table 2 (the same applies hereinafter). The proportion of monomer units in the copolymer (100 parts by mass) is a value calculated based on the charged amount of the monomer at the time of producing the copolymer. The copolymer in the emulsion was recovered and the average molecular weight was measured in the manner as described above. The results are shown in Table 2.

Production Example 2: Production of Emulsion Containing Copolymer (B1)

An emulsion of the composition as shown in Table 2 was produced (the same applies hereinafter).

In Production Example 1, monomer (a5) was changed from HEMA to NMAM. Further, at the time of putting monomer (a1)) and monomer (a5) into the glass container, monomer (a3) (STA) was also added. Otherwise in the same manner as in Production Example 1, an emulsion containing a copolymer (B1) was obtained.

In the same manner as in Production Example 1, the composition (unit: parts by mass) and solid content concentration (unit: mass %) of the obtained emulsion, and the average molecular weights of the copolymer are shown in Table 2 (the same applies hereinafter).

Production Example 3 to 5: Production of Emulsions Containing, Respectively, Other Copolymer (G1) to (G3)

Production Example 3 to 5 are examples wherein emulsions containing, respectively, other copolymers (G1) to (G3) other than copolymer (A) and copolymer (B), were produced.

In the same manner as in Production Example 1, by a method of introducing monomer (a2) (VDC) or monomer (a4) (VCM) after adding the polymerization initiator and substituting the gas-phase with nitrogen, the emulsions containing the copolymers were produced.

Production Example 6: Production of Emulsion Containing Copolymer (B2)

In Production Example 2, monomer (b1) was changed from FMA to αFA, and without using monomer (b5), monomer (b6) was used. Otherwise in the same manner as in Production Example 2, an emulsion containing a copolymer (B2) was obtained. [Production Example 7: Production of emulsion containing copolymer (A2)]

In Production Example 1, monomer (a1)) was changed from FMA to αFA, and without using monomers (a4) and (a5), monomers (a3) and (a6) were used. Otherwise in the same manner as in Production Example 1, an emulsion containing a copolymer (A2) was obtained.

TABLE 2

|  |  |  |  | Production Ex. 1 | Production Ex. 2 | Production Ex. 3 | Production Ex. 4 | Production Ex. 5 | Production Ex. 6 | Production Ex. 7 |
|---|---|---|---|---|---|---|---|---|---|---|
|  | Copolymer |  |  | A1 | B1 | G1 | G2 | G3 | B2 | A2 |
| Composition of emulsion containing copolymer (100 parts by mass) [parts by mass] | Proportion of monomer units in copolymer (100 parts by mass) | a1 · b1 | FMA | 79 | 70 | 70 | 90 | 13 |  |  |
|  |  |  | αFA |  |  |  |  |  | 60 | 60 |
|  |  | a2 · b2 | VDC | 15 | 10 |  |  | 20 | 10 | 20 |
|  |  | a3 · b3 | STA |  | 9 | 10 | 5 |  | 6 | 3 |
|  |  |  | BeA |  |  |  |  | 60 |  |  |
|  |  | a4 · b4 | VCM | 5 | 10 | 15 | 5 |  | 10 |  |
|  |  | a5 · b5 | NMAM |  | 1 |  |  |  |  |  |
|  |  |  | HEMA | 1 |  |  |  | 1 |  |  |
|  |  |  | D-BI |  |  | 5 |  |  |  |  |
|  |  | a6 · b6 | DOM |  |  |  |  |  | 6 |  |
|  |  |  | IBMA |  |  |  |  |  | 14 | 17 |
|  | Surfactant (D) |  | PEO-20 | 4 | 4 | 4 | 4 | 4 | 3.4 | 3.4 |
|  |  |  | PEO-T |  |  |  |  |  | 1 | 1 |
|  |  |  | P204 | 1 | 1 | 1 | 1 | 1 |  |  |
|  |  |  | TMAC | 0.5 | 1.5 | 1 | 1 | 1 | 1.4 | 1.4 |
|  |  |  | DSMAC |  |  |  |  |  | 5 | 5 |
|  | Molecular weight controlling agent | StSH |  | 0.1 | 1 | 1 | 1 | 1 | 1 | 1 |
|  | Polymerization initiator | VA061A |  | 0.5 | 0.5 | 0.5 | 0.5 | 0.5 |  |  |
|  |  | V-50 |  |  |  |  |  |  | 0.5 | 0.5 |
|  | Liquid medium (C) | DPG |  | 30 | 30 | 30 | 30 | 30 | 30 | 30 |
|  |  | Water |  | 155 | 155 | 155 | 155 | 155 | 190 | 190 |
|  | Total |  |  | 291.1 | 293.0 | 292.5 | 292.5 | 292.5 | 332.3 | 332.3 |
|  | Solid content concentration [mass %] |  |  | 34.2 | 35.1 | 34.8 | 33.9 | 36.0 | 32.1 | 31.6 |
|  | Number average molecular weight of copolymer Mn |  |  | 35,000 | 17,000 | 16,000 | 25,000 | 17,000 | 17,000 | 19,000 |
|  | Mass average molecular weight of copolymer Mw |  |  | 150,000 | 50,000 | 29,000 | 64,000 | 37,000 | 25,000 | 55,000 |

Preparation of Water/Oil Repellent Composition and Treatment of Fabric

Ex. 1 to 13

To the emulsion containing the copolymer obtained in each of Production Examples 1 to 7, water was added to bring its solid content concentration to be 30 mass %.

That is, the emulsion(s) containing the copolymer(s), and the additives, were mixed and diluted with tap water, so that their contents (unit: g/L) would be as shown in Table 3 and 4. The pH of the diluted solution was adjusted by acetic acid to pH5 to obtain a water/oil repellent composition.

To the obtained water/oil repellent composition, a base fabric (nylon high density taffeta) was dipped by a padding method and then, squeezed so that the wet pick-up would be 52 mass %. The fabric was heated and dried at 110° C. for 90 seconds, then heated and cured at 170° C. for 60 seconds, and left to stand overnight in a room at 25° C. under a humidity of 60%, to obtain a test fabric. Of the obtained test fabric, both face and back side surfaces were water/oil repellent-treated surfaces.

50 g of a urethane prepolymer (trade name: Resamine CU-4700, manufactured by Dainichiseika Color & Chemicals Mfg. Co., Ltd., polyethylene adipate/MDI prepolymer), 0.5 g of a cross-linking agent (trade name: Coronate HL, manufactured by Nippon Polyurethane Industry Co., Ltd.), 1.0 g of a coloring agent (trade name: Seika Seven ALT #8000, manufactured by Dainichiseika Color & Chemicals Mfg. Co., Ltd.), and 25 g of N,N-dimethylformamide (DMF), were mixed to obtain a coating liquid for forming a moisture-permeable waterproofing film.

Using an applicator (RK Print Coat Instruments Ltd.), the coating liquid was applied to the back side of the test fabric under conditions of a coating speed of 0.1 m/sec. and a coating liquid temperature of 35° C. so that the thickness after drying would be 40 μm. After the coating, the test fabric was left to stand still for one minute, then immersed in water of 20° C. for 2 minutes and then immersed in water of 40° C. for 2 minutes, followed by drying at 120° C. for 60 seconds to obtain a moisture-permeable waterproofing film-attached test fabric.

With respect to the obtained moisture-permeable waterproofing film-attached test fabric, the water repellency, oil repellency, permeability of the coating liquid, peel strength of the moisture-permeable waterproofing film and solvent resistance, were evaluated by the above-mentioned methods. The results are shown in Tables 3 and 4.

TABLE 3

| | | | Ex. 1 | Ex. 2 | Ex. 3 | Ex. 4 | Ex. 5 | Ex. 6 | Ex. 7 |
|---|---|---|---|---|---|---|---|---|---|
| Formulation [g/L] | Emulsion [solid content concentration: 30 mass %] | Production Example 1 (Copolymer A1) | 60 | 48 | 45 | 42 | 39 | 36 | — |
| | | Production Example 2 (Copolymer B1) | — | 12 | 15 | 18 | 21 | 24 | 60 |
| | | Production Example 3 (Copolymer G1) | — | — | — | — | — | — | — |
| | | Production Example 4 (Copolymer G2) | — | — | — | — | — | — | — |
| | | Production Example 5 (Copolymer G3) | — | — | — | — | — | — | — |
| | | Production Example 6 (Copolymer B2) | — | — | — | — | — | — | — |
| | | Production Example 7 (Copolymer A2) | — | — | — | — | — | — | — |
| | Additives (E) | KB1000 | 15 | 15 | 15 | 15 | 15 | 15 | 15 |
| | | M-3 | 3 | 3 | 3 | 3 | 3 | 3 | 3 |
| | | ACX | 3 | 3 | 3 | 3 | 3 | 3 | 3 |
| | Copolymer (A):copolymer (B) | | 10:0 | 8:2 | 75:25 | 7:3 | 65:35 | 6:4 | 0:10 |
| Evaluations | Peel strength of moisture-permeable waterproofing film [N/10 cm] | | 20 | 22 | 24 | 28 | 29 | 32 | 22 |
| | Penetration of coating liquid (difference in brightness ΔL) | | 1.7 | 1.9 | 1.9 | 2.1 | 2.3 | 2.2 | 2.0 |
| | Water repellency | Initial | 5− | 5− | 5− | 5− | 5− | 4+ | 5 |
| | | After washing 20 times | 3+ | 3 | 3 | 3− | 3− | 2+ | 2+ |
| | | Oil repellency | 4− | 3 | 3+ | 3+ | 3+ | 3 | 3 |
| | Solvent resistance [seconds] | Toluene | 179 | 172 | 169 | 163 | 153 | 163 | 140 |

TABLE 4

| | | | Ex. 8 | Ex. 9 | Ex. 10 | Ex. 11 | Ex. 12 | Ex. 13 |
|---|---|---|---|---|---|---|---|---|
| Formulation [g/L] | Emulsion [solid content concentration: 30 mass %] | Production Example 1 (Copolymer A1) | — | 42 | 42 | 65 | — | — |
| | | Production Example 2 (Copolymer B1) | — | — | — | — | 35 | — |
| | | Production Example 3 (Copolymer G1) | 60 | — | — | — | — | — |
| | | Production Example 4 (Copolymer G2) | — | 18 | — | — | — | — |
| | | Production Example 5 (Copolymer G3) | — | — | 18 | — | — | — |

TABLE 4-continued

| | | Ex. 8 | Ex. 9 | Ex. 10 | Ex. 11 | Ex. 12 | Ex. 13 |
|---|---|---|---|---|---|---|---|
| | Production Example 6 (Copolymer B2) | — | — | — | 35 | — | 35 |
| | Production Example 7 (Copolymer A2) | — | — | — | — | 65 | 65 |
| Additives (E) | KB1000 | 15 | 15 | 15 | 15 | 15 | 15 |
| | M-3 | 3 | 3 | 3 | 3 | 3 | 3 |
| | ACX | 3 | 3 | 3 | 3 | 3 | 3 |
| Copolymer (A):copolymer (B) | | — | — | — | 65:35 | 65:35 | 65:35 |
| Evaluations | Peel strength of moisture-permeable waterproofing film [N/10 cm] | 18 | 20 | 18 | 44 | 40 | 43 |
| | Penetration of coating liquid (difference in brightness ΔL) | 10 | 2.7 | 2.5 | 1.4 | 1.0 | 1.8 |
| Water repellency | Initial | 5 | 5 | 5 | 5 | 5 | 5 |
| | After washing 20 times | 4 | 3+ | 3+ | 3+ | 3 | 3− |
| | Oil repellency | 3 | 3+ | 3 | 3− | 3− | 3− |
| Solvent resistance [seconds] | Toluene | 66 | 136 | 134 | 164 | 148 | 158 |

Ex. 1 to 7 are Examples wherein in the water/oil repellent composition comprising a copolymer (A), a copolymer (B), a softening agent and a thermosetting agent, the mass ratio of the copolymer (A) and the copolymer (B) was changed. When the softening agent is blended, the coating liquid is likely to penetrate and the peel strength tends to decrease.

As shown in the results in Table 3, as compared with Ex. 1 (Comparative Example) not containing the copolymer (B1), Ex. 2 to 6 having the copolymer (A1) and the copolymer (B1) mixed, are substantially equal in penetration of the coating liquid, and on the other hand, they showed that the peel strength of the moisture-permeable waterproofing film was high, and the moisture-permeable waterproofing film was hardly peeled. Further, as compared with Ex. 7 not containing the copolymer (A1), Ex. 2 to 6 were excellent in washing durability. Especially, Ex. 3 to 6 showed that the peel strength was high, and the moisture-permeable waterproofing film was hardly peeled.

Ex. 11 is an Example of using the copolymer (A1) and the copolymer (B2) in combination, Ex. 12 is an Example of using the copolymer (A2) and the copolymer (B1) in combination, and Ex. 13 is an Example of using the copolymer (A2) and the copolymer (B2) in combination.

As shown in the results in Table 4, in comparison with Ex. 5 wherein the copolymer (A):the copolymer (B) was 65:35, effects of at least equal were obtained in water/oil repellency, washing resistance and solvent resistance.

Ex. 8 is a Comparative Example wherein neither the copolymer (A) nor the copolymer (B) was used, and another copolymer (G1) was used. The peel strength of the moisture-permeable waterproofing film was low, and especially penetration of the coating liquid was remarkably high.

Ex. 9 is a Comparative Example using the copolymer (A) and another copolymer (G2) in combination. The peel strength of the moisture-permeable waterproofing film was low, and the solvent resistance was also inferior.

Ex. 10 is a Comparative Example using the copolymer (A) and another copolymer (G3) in combination. The peel strength of the moisture-permeable waterproofing film was low, and the solvent resistance was also inferior.

INDUSTRIAL APPLICABILITY

The water/oil repellent composition of the present invention is useful as a water/oil repellent for fabric (woven, knitted, non-woven fabrics, etc.), various types of textile products (clothing articles (sportswears, coats, jackets, work clothing, uniforms, etc.), bags, industrial materials, etc.).

This application is a continuation of PCT Application No. PCT/JP2014/080969, filed on Nov. 21, 2014, which is based upon and claims the benefit of priority from Japanese Patent Application No. 2013-244291 filed on Nov. 26, 2013. The contents of those applications are incorporated herein by reference in their entireties.

What is claimed is:

1. A water/oil repellent composition, comprising:
   (A) a copolymer (A) comprising from 40 to 95 mass % of units based on a monomer (a1), from 1 to 60 mass % of units based on a monomer (a2), and from 0 to less than 5 mass % of units based on a monomer (a3);
   (B) a copolymer (B) comprising from 40 to 91 mass % of units based on a monomer (b1), from 2 to 20 mass % of units based on a monomer (b2), from 5 to 20 mass % of units based on a monomer (b3), and from 2 to 20 mass % of units based on a monomer (b4); and
   (C) a liquid medium (C), wherein:
   the monomer (a1) is a unit represented by the formula (1):

$(Z-Y)_n X$                                         (1);

the monomer (a2) is a vinylidene chloride unit or a vinylidene fluoride unit;
   the monomer (a3) is an acrylate or methacrylate unit comprising a saturated hydrocarbon group having at least 12 carbon atoms;
   the monomer (b1) is a unit represented by the formula (1) above;
   the monomer (b2) is a vinylidene chloride unit or a vinylidene fluoride unit;
   the monomer (b3) is an acrylate or methacrylate unit comprising a saturated hydrocarbon group having at least 12 carbon atoms;
   the monomer (b4) is a vinyl chloride unit;
   Z is a $C_{1-6}$ polyfluoroalkyl group or any one of formulae (2-1) to (2-3):

$C_iF_{2i+1}O(CFX^1CF_2O)_jCFX^2-$         (2-1)

$C_iF_{2i+1}[CH_2CF_2]_v-$         (2-2)

$C_iF_{2i+1}[CH_2CF_2]_v[CF_2CF_2]_r-$         (2-3);

Y is a divalent organic group having no fluorine atom, or a single bond;

n is 1 or 2;

X is, when n is 1, a group represented by any one of formulae (3-1) to (3-5):

$$—CR^2=CH_2 \quad (3\text{-}1)$$

$$—C(O)OCR^2=CH_2 \quad (3\text{-}2)$$

$$—OC(O)CR^2=CH_2 \quad (3\text{-}3)$$

$$—OCH_2\text{-}\varphi\text{-}CR^2=CH_2 \quad (3\text{-}4)$$

$$—OCH=CH_2 \quad (3\text{-}5);$$

X is, when n is 2, a group represented by any one of following formulae (4-1) to (4-4):

$$—CH[—(CH_2)_m CR^3=CH_2]— \quad (4\text{-}1)$$

$$—CH[—(CH_2)_m C(O)OCR^3=CH_2]— \quad (4\text{-}2)$$

$$—CH[—(CH_2)_m OC(O)CR^3=CH_2]— \quad (4\text{-}3)$$

$$—OC(O)CH=CHC(O)O— \quad (4\text{-}4);$$

i is an integer of from 1 to 6;

j is an integer of from 0 to 10;

v is an integer of from 1 to 4;

r is an integer of from 1 to 3;

each of $X^1$ and $X^2$ are independently a fluorine atom or a trifluoromethyl group;

$R^2$ is a hydrogen atom, a methyl group or a halogen atom;

φ is a phenylene grown;

$R^3$ is a hydrogen atom, a methyl group or a halogen atom; and m is an integer of from 0 to 4.

2. The water/oil repellent composition according to claim 1, wherein:

Z is a $C_{4-6}$ perfluoroalkyl group;

Y is a $C_{1-4}$ alkylene group;

n is 1;

X is —$C(O)OCR^2=CH_2$; and $R^2$ is a hydrogen atom, a methyl group, a fluorine atom or a chlorine atom.

3. The water/oil repellent composition according to claim 1, wherein a proportion of the copolymer (A) is from 20 to 90 mass %, and a proportion of the copolymer (B) is from 10 to 80 mass %, relative to a total mass of the copolymer (A) and the copolymer (B).

4. The water/oil repellent composition according to claim 1, wherein the copolymer (A) further comprises units based on a monomer (a4), which is a vinyl chloride unit.

5. The water/oil repellent composition according to claim 1, wherein the copolymer (A) further comprises units based on a monomer (a5) having no polyfluoroalkyl group and having a crosslinkable functional group.

6. The water/oil repellent composition according to claim 1, wherein the copolymer (B) further comprises units based on a monomer (b5), having no polyfluoroalkyl group and having a crosslinkable functional group.

7. The water/oil repellent composition according to claim 1, wherein:

a mass average molecular weight (Mw) of the copolymer (A) is larger than a mass average molecular weight (Mw) of the copolymer (B), and a difference is from 5,000 to 400,000; or a number average molecular weight (Mn) of the copolymer (A) is larger than a number average molecular weight (Mn) of the copolymer (B), and a difference is from 2,000 to 50,000.

8. The water/oil repellent composition according to claim 1, wherein a difference between a content (mass %) of units based on the monomer (a3) in the copolymer (A) and a content (mass %) of units based on the monomer (b3) in the copolymer (B) is at least 2 (mass %).

9. The water/oil repellent composition according to claim 1, wherein $R^2$ in either the units based on the monomer (a1) in the copolymer (A) or the units based on the monomer (b1) in the copolymer (A) is a hydrogen atom or a methyl group, and $R^2$ in the other is a fluorine atom or a chlorine atom.

10. An article, comprising a porous substrate, wherein the porous substrate has a water/oil repellent-treated surface treated with the water/oil repellent composition of claim 1 on at least one side, and has a moisture-permeable waterproofing film on one side.

11. The article according to claim 10, wherein the treated porous substrate has water/oil repellent-treated surfaces on both sides, and has the moisture-permeable waterproofing film on one water/oil-repellent treated surface.

12. The article according to claim 10, wherein the porous substrate is a fabric.

13. A process for producing an article having a porous substrate, the process comprising:

treating at least one side of a porous substrate with the water/oil repellent composition of claim 1 to form a water/oil repellent-treated surface; and applying a coating liquid comprising a material adapted to form a moisture-permeable waterproofing film to one side of the porous substrate to form the moisture-permeable waterproofing film.

14. The process according to claim 13, wherein the water/oil repellent-treated surface is formed on both sides of the substrate, and then the moisture-permeable waterproofing film is formed on one water/oil repellent-treated surface.

* * * * *